June 28, 1960 B. BIRKENES 2,943,190

TONE AND VOLUME CONTROL

Filed Oct. 17, 1956

INVENTOR.
Bernhard Birkenes

BY

Mueller and Aichele

Attys.

United States Patent Office 2,943,190
Patented June 28, 1960

2,943,190

TONE AND VOLUME CONTROL

Bernhard Birkenes, Chicago, Ill., assignor to Motorola, Inc., Chicago, Ill., a corporation of Illinois Filed Oct. 17, 1956, Ser. No. 616,566

5 Claims. (Cl. 250—20)

Figure 1:
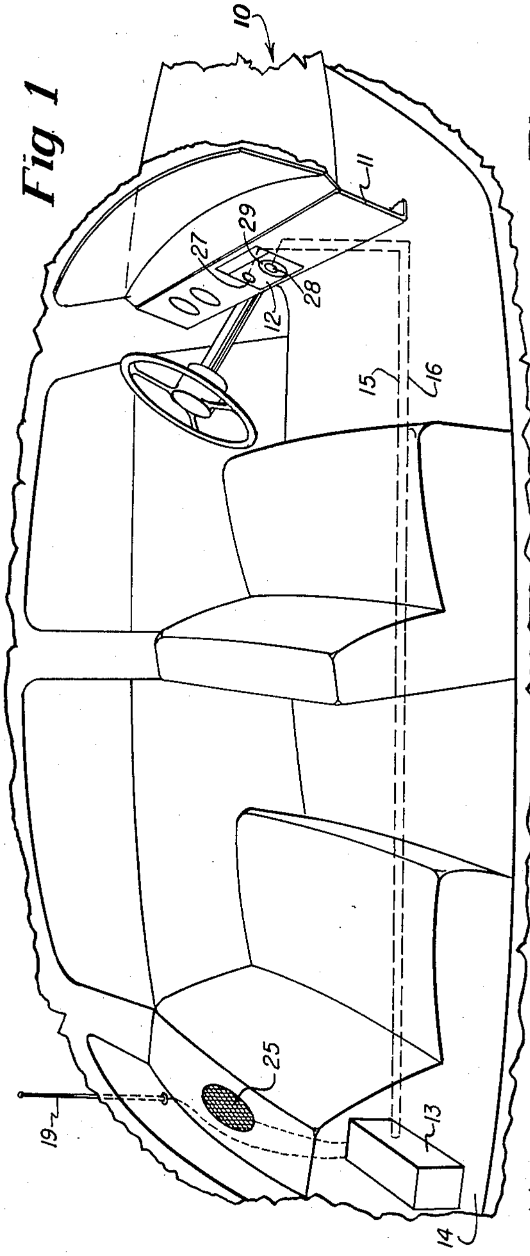

This invention relates to control circuits for radio receivers, and more particularly to a simple remote volume and tone control circuit.

It may be desirable to mount automobile radio receivers in the trunks of the automobiles with the volume and tone controls on the dashboard or at other accessible points in the automobile. It would be necessary to shield lead wires running from these controls to the radio receivers proper in order to eliminate the pick up of noise by such relatively long wires. Hence, it is desirable to reduce the number of such shielded wires as much as possible because of the expense thereof and also because of possible interference from signals picked up by the wires even when so shielded. Hitherto, at least three such leads have been required, one for remote tone control and two for the volume control.

An object of the invention is to provide a new and improved tone and volume control circuit.

Another object of the invention is to provide a simple tone and volume control circuit for remote control of radios.

A further object of the invention is to provide a tone and volume control circuit for a radio receiver having a single lead connecting the control circuit to the radio receiver.

A feature of the invention is the provision of a radio receiver including an individual tone control element and an individual volume control element in a control circuit which is connected to the receiver by a single lead wire.

Another feature of the invention is the provision of a variable volume control resistor connected in a radio receiver circuit and a resistance-capacitance network connected to the variable resistor to control the tone of the radio circuit.

A further feature of the invention is the provision of a variable volume control resistor connected to a control point in an audio stage of radio receiver to control the signal level at that point, and a resistance-capacitance network connected to the volume control resistor at the ends thereof and at an intermediate point and including a potentiometer having an adjustable slider which changes the frequency characteristic of the network to thereby control the tone of the receiver.

Figure 2:
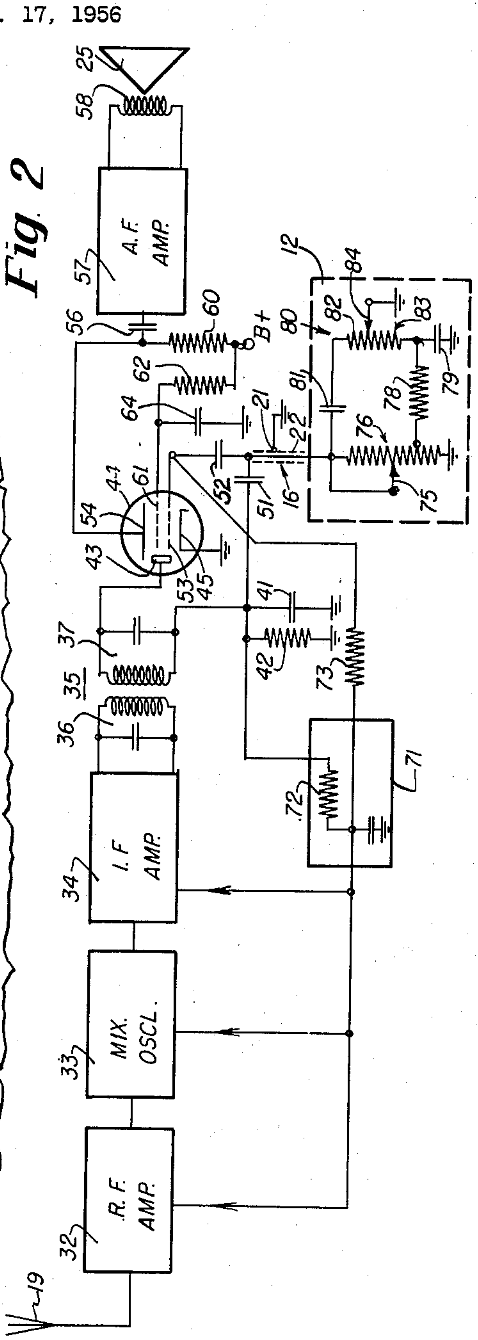

Referring to the drawings:

Fig. 1 is a perspective view showing a radio receiver having a remote volume and tone control circuit in accordance with the invention mounted in an automobile; and Fig. 2 is a schematic diagram of a radio receiver circuit including the tone and volume control circuit.

The present invention provides a remote volume and tone control for an automobile radio receiver which may be located in the trunk of an automobile. The remote tone and volume control, as well as a remote tuning control, may be located on the dashboard of the automobile, and the tone and volume control are connected to an audio amplifier stage of the receiver through a single shielded wire. The receiver detector is connected to the audio amplifier through a pair of series connected capacitors. The shielded wire is coupled from the junction of the two capacitors to a variable volume control resistor. The variable resistor has one end grounded and adjustment of the resistor slider controls the signal thereacross. The volume control resistor is shunted by a frequency control circuit including a first relatively small capacitor connected in series with one end of a tone control potentiometer having its slider connected to ground. The capacitor presents a high impedance to low frequency components of the signals applied to the lead wire to accentuate the low frequencies. A resistor is connected between an intermediate point of the volume control resistor and the other end of the tone control potentiometer, and a second larger capacitor connects this end to ground. This forms a low frequency tone compensation circuit. As the slider of the tone control potentiometer is moved toward the end thereof adjacent to the first small capacitor, the impedance to high audio frequency signal components is reduced and the low frequencies response is increased. Conversely, as the slider is moved toward the second larger capacitor, the impedance path of the high audio frequency signals components is increased and the low frequency compensation is removed to increase the high frequency response. Thus, only a single lead wire is required from both the tone control and the volume control and an extra shielded lead wire between the dashboard and the trunk of the automobile is eliminated.

Referring now to the drawing, in Fig. 1 there is shown an automobile 10 having a dashboard 11 on which a control panel 12 of a radio receiver 13 is mounted. The radio receiver 13 itself is mounted in a trunk 14 of the automobile, and is connected by leads 15 and 16 to the control panel 12. The lead 16 includes a shield 21 connected to ground and a conductor or wire 22 and acts to control both tone and volume of the radio receiver. A volume control knob 28 and a tone control knob 29 are located on the panel 12. The lead 15 may include one or more conductors as required for turning the set on and off and operating the set from the tuning control 27 on the panel 12. A speaker 25 may be in the back seat area of the automobile and the antenna 19 may be installed near the trunk.

Considering now the schematic diagram of the radio receiver 13 shown in Fig. 2, signals picked up by antenna 19 are applied to a radio frequency amplifier stage 32, which feeds signals to a mixer-oscillator stage 33 from which the intermediate frequency signals are transmitted to an intermediate frequency stage 34. The intermediate frequency amplifier stage feeds output signals to a transformer 35 having tuned circuits 36 and 37. The intermediate frequency carrier signal is applied by circuit 37 to a detector formed by plate 43 and the common cathode of the multiple element tube 44 and the detected signal is developed across resistor 42 which is bypassed by capacitor 41.

The audio signal is transmitted through capacitor 51 in series with capacitor 52 to the control grid 53 of the tube 44, and the plate 54 is supplied with B-plus voltage from a positive terminal marked B+ through a resistor 60. The output voltage of the plate 53 is transmitted by coupling capacitor 56 to audio frequency amplifier stage 57 which drives the voice coil 58 of the loudspeaker 25. The B-plus voltage also is supplied to screen grid 61 of the tube 44 through a resistor 62 connected to a B-plus terminal 63, and a radio frequency bypass capacitor 64 connects the screen grid 61 to ground. The value of the resistor 62 may be chosen to reduce distortion in the stage 44 in a manner well known in the art.

The radio receiver also is provided with an automatic gain control circuit 71 of a well known type. This may apply gain control signals to the radio frequency amplifier stage 32, the mixer oscillator stage 33, the intermediate frequency amplifier stage 34 and the audio amplifier provided by tube 44. Resistors 72 and 73 connect the control grid 53 to ground through resistor 42 to provide a D.C. return path for the control grid 53 and also bias the grid 53 relative to the cathode 45.

The conductor 22 is connected at its upper end as viewed in Fig. 2 to the junction of capacitors 51 and 52, which form a voltage divider, and is connected at its lower end to a slider 75 of a volume control variable resistor 76. The lower end of the resistor 76 is connected to ground. Accordingly by adjustment of the slider the resistance from the junction between capacitors 51 and 52 to ground is varied and the signal at this point is variably attenuated. A resistor 78 is connected in series with capacitor 79 from a tap on resistor 76 to ground. This path offers low impedance to high audio frequency signals components and higher impedance to low audio frequency signal components to provide low frequency compensation. A tone control network 80 is connected to the conductor 22 in parallel with the resistor 76 and includes capacitor 81 connected from the ungrounded end of resistor 76 to the resistor portion 82 of a manually variable potentiometer 83 having a slider 84 connected to ground. The other end of the resistor portion 82 is connected to the junction of resistor 78 and capacitor 79.

The capacitor 81 and the portion of the resistor portion 82 between the slider 84 and the capacitor 81 provide a path for high audio frequency signals to pass to ground in shunt with the resistor 76. When the slider 84 is near the upper end of the resistor 82, a very low impedance path for the higher audio frequency signal components is provided so that the high audio frequency components are bypassed and are not transmitted strongly to the control grid 53 of the tube 44. Accordingly, movement of the slider 84 upward as shown in the drawing increases the low frequency response. However, as the slider 84 is moved down the resistor portion 82, the impedance of the path through capacitor 81 to the high audio frequency signal components is increased so that suppression thereof is reduced. Also as the slider 84 moves toward the capacitor 79, this capacitor is gradually shorted to remove the low frequency compensation provided thereby. Accordingly the high frequency response is increased as the slider is moved down.

Thus, by varying the slider 84 manually through the control knob 29, the tone may be varied gradually. The knob 28 may be turned to move the slider 75 along the resistor 77 to control the volume of the output of the radio with only minor effects on the tone thereof. Since both the volume control and the tone control are connected to the conductor 22, only the single shielded lead 16 is required to connect both these controls to the remotely spaced radio 13.

The following circuit constants of the above-described radio receiver are listed below solely for purpose of illustration and are not intended to limit the scope of the invention in any way:

| | | |
|---|---|---|
| Resistor: | | |
| 42 | megohms | 1–1.5 |
| 60 | kilohms | 120 |
| 62 | do | 270 |
| 76 | megohms | 1–2.0 |
| 78 | kilohms | 47 |
| 83 | megohm | 1 |
| Capacitor: | | |
| 41 | micromicrofarads | 100 |
| 51 | microfarads | .05 |
| 52 | do | .05 |
| 79 | do | .02 |
| 81 | do | .004 |

The only components of the tone-volume-control unit that need to be mounted on the dashboard of the automobile are the resistors 76, 78, and 83, and the capacitors 79 and 81, which occupy only a small amount of space and can be mounted on the panel 12 very easily. The single lead 16 takes care of both the tone control and the volume control. The simple circuit provided has been found to be entirely satisfactory. Any audio leads extending along the automobile must be shielded, and in the above-described circuit the only shielded lead required is the lead 16. The combined tone-volume-control unit eliminates the customary second and third shielded leads.

I claim:

1. In a radio receiver circuit, an audio frequency signal source having a terminal connected to a reference potential, an amplifier stage, and a pair of series-connected capacitors connecting said source to said amplifier stage, a volume-tone-control system including a single lead coupled to the junction of said capacitors, a first variable volume control resistor connected between said lead and said reference potential, a second variable tone control resistor having a slider connected to said reference potential, a first capacitor connecting one end of said second variable resistor to said lead, a third resistor connecting the other end of said second variable resistor to a point on the first resistor, and a second capacitor connecting said other end of said second variable resistor to said reference potential, said single lead being the sole connection from said volume-tone-control system to the amplifier stage.

2. In a radio receiver circuit, a detector circuit, an amplifier stage coupled to the detector circuit, a volume-tone-control system including a single lead coupled to the detector circuit and the amplifier stage, a first variable resistor connected between the lead and a reference voltage point, a potentiometer having a slider connected to the reference voltage point, a low audio frequency blocking capacitor coupling one end of the potentiometer to the lead, a second resistor connecting the other end of the potentiometer to an intermediate point of the first resistor, and a low audio frequency blocking capacitor connecting the juncture point of the potentiometer and the second resistor to the reference voltage point said single lead forming the sole connection from said volume-tone-control system to the radio receiver circuit.

3. A radio receiver for an automobile having a dash and a trunk and in which the receiver is installed in the trunk with control means therefor on the dash, said receiver including, an audio amplifier stage having an electronic valve provided with a control element, a detector circuit, a pair of series capacitors passing audio frequency signals from said detector circuit to said control element of said stage, said control means including a tone-volume-control network, a single shielded lead extending from the automobile trunk to the dash and connected at one end to the junction of said capacitors, a volume control variable resistor connecting the other end of said lead to ground, a second resistor connected at one end to an intermediate point on said volume control resistor, a third capacitor connecting the other end of said second resistor to ground, a tone control potentiometer having a slider connected to ground and connected at one end to the junction of said third capacitor and said second resistor; a fourth capacitor connected between said lead and the other end of said potentiometer for permitting high audio frequency signals to pass therethrough, said single shielded lead forming the sole connection from the tone-volume-control network to the radio receiver.

4. In a tone and volume control for an auto radio having a detector-amplifier vacuum tube stage including detector diode means for developing audio frequency signal supplied thereto and also having a control grid for controlling amplification by the stage, the combination therewith of first and second capacitors serially coupling the detector diode means to the control grid to supply the developed signal thereto, a volume-tone-control system including a single lead connected at one end to the juncture of said capacitors, a variable resistor connected between said lead and ground, a second resistor connected to an intermediate point on said variable resistor, a third capacitor connecting said second resistor to ground, a fourth capacitor connected at one side to said lead, a potentiometer connecting the other side of said fourth capacitor to said second resistor and also being provided with a slider connected to ground, said single lead forming the sole connection from the volume-tone-control system to the detector-amplifier vacuum tube stage.

5. A tone-volume control circuit for coupling a source of audio signal voltage above a reference voltage point to an electron valve having a control element, said circuit including in combination, first and second series-connected capacitors coupling the signal voltage source to the control element of the electron valve, a single control lead connected to the junction of said capacitors, a control network including a volume control variable resistor connected between said lead and a reference voltage point, said variable resistor being variable to change the resistance thereof between said control lead and the reference voltage point, said first capacitor being connected between the signal voltage source and said single control lead and having a capacitance offering significant impedance in the audio frequency range, so that the ratio of the impedance of said first capacitor to the impedance of said variable resistor increases as said variable resistor is adjusted to reduce the resistance thereof to thereby reduce the signal voltage across said variable resistor, and an adjustable resistance-capacitance frequency selective tone control network connected in shunt with the volume control variable resistor, said signal control lead forming the sole connection from said control network to the source of audio signal voltage and to the electron valve.

References Cited in the file of this patent

UNITED STATES PATENTS

| | | |
|---|---|---|
| 1,915,290 | Clement | June 27, 1933 |
| 2,043,161 | Foster | June 2, 1936 |
| 2,101,832 | Barton | Dec. 14, 1937 |
| 2,217,178 | Masters | Oct. 8, 1940 |
| 2,361,602 | Clark | Oct. 31, 1944 |
| 2,445,031 | McDonald | July 13, 1948 |
| 2,680,232 | Claras | June 1, 1954 |
| 2,761,921 | Kuhl | Sept. 4, 1956 |